United States Patent Office 3,472,839
Patented Oct. 14, 1969

3,472,839
CELLULOSE MODIFICATION PROCESS
AND HEXAHALOACETONE-UREA ADDUCT CATALYSTS
Giuliana C. Tesoro, Dobbs Ferry, N.Y., assignor to J. P. Stevens & Co., Inc., New York, N.Y., a corporation of Delaware
No Drawing. Filed July 3, 1967, Ser. No. 650,654
Int. Cl. C08b 3/02, 13/00; B01j 11/82
U.S. Cl. 260—226                       11 Claims

ABSTRACT OF THE DISCLOSURE

A process for modifying cellulose with a composition comprising:
(a) a modifying amount of carboxylic acid, and
(b) a catalytic amount of a hexahaloacetone-urea adduct of the formula:

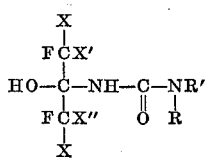

wherein X, X' and X" are halogen atoms and R and R' are selected from the group consisting of hydrogen and lower alkyl groups having less than six carbon atoms.

---

This invention concerns the modification of cellulose using a heretofore undescribed class of esterification catalysts.

More particularly, this invention relates to the direct esterification of cellulose fibers without concurrent damage to the esterified fibers.

The term modification as used herein refers to the alteration or improvement of characteristics and properties that result when cellulose and its blends are treated at elevated temperatures with a carboxylic acid in the presence of the catalysts of this invention.

Cellulose is a naturally occurring polymer which is of great importance because it is abundant, and low in cost. The modification of cellulose by chemical treatment such as esterification increases the usefulness of cellulose by the alteration of its properties. For example, many cellulose esters such as the oleate, acetate, propionate, acetate butyrate, and the like are utilized in commercial quantities for a variety of purposes including films, sheeting, coatings, photography, molding resins and textiles.

There are many different methods employed for obtaining cellulose esters. These include the esterification with acid halides under anhydrous conditions and the direct esterification with acid. The former method not only requires anhydrous conditions, but also requires a large excess of halide and the use of an acid acceptor such as pyridine. Direct esterification with fatty acids is disadvantageous in that it must be carried out at such high temperatures and prolonged reaction periods that the strongly acid catalyst that is required frequently degrades the cellulose chain to the point where the products are useless.

The modification of cellulose fibers and cellulose blends by esterification is further complicated by the fact that the use of anhydrous media is frequently not practical or desirable, while direct esterification procedures are slow and often impair the properties of the treated material to an intolerable level.

In view of the above-recited deficiencies of the art, there is an acute need for direct esterification procedures which lend themselves to commercial practice, yet do not result in a degraded product.

Ideally, the improved process would employ effective catalysts, would produce the desired degree of esterification in good yield, and would make use of relatively mild reaction conditions which would minimize damage to the cellulose chain.

Thus, it is an object of this invention to introduce a novel class of catalysts especially suitable for the esterification of cellulose, particularly in the form of its fibers.

Another object is the development of direct cellulose esterification procedures useful in producing the desired degree of esterification in cellulose under reaction conditions, which minimize damage to the cellulose chain.

Yet another object of this invention is the resultant crosslinking of cellulose and its blend that takes place when the catalytic adducts of this invention are employed as esterification catalysts in the presence of di- or polycarboxylic acids.

Unexpectedly, a novel class of catalysts have been discovered which offer the desired advantages sought in esterification procedure. These catalysts are adducts of hexahaloacetone and urea having the general formula below:

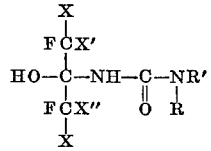

wherein X, X' and X", which can be the same or different at any given time are halogen atoms such as fluorine, chlorine or bromine and R and R' which also can be the same or different at any given time are selected from the group consisting of hydrogen and lower alkyl groups having less than six carbon atoms.

The catalytically active adducts of this invention are obtained from the reaction of hexahaloacetones with primary amides in an inert non-aqueous solvent medium such as can be supplied by isopropyl ether or tetrahydrofuran, or similar solvents. Detailed descriptions of the preparation have been published by P. E. Newallis et al., in Journal of Organic Chemistry, volume 29, pages 3114–3116 (1964).

The novel catalysts are especially advantageous in the direct esterification of cellulose and its blends with carboxylic acids, particularly with those di- or polycarboxylic acids which because of their low volatility can function under reaction temperatures of about 150° C. and higher.

The following adducts are illustrative of the class of catalysts which are applicable to the practice of the process of this invention:

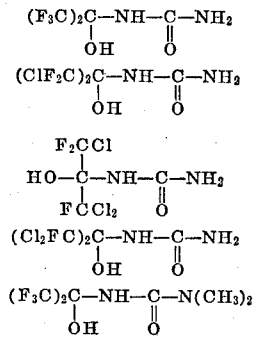

The above catalysts can be employed with a variety of carboxylic acids in the esterification of cellulose using the inventive process. The polycarboxylic acids are particularly useful in the modification (cross-linking) of cellulose. Illustrative carboxylic acids include monocarboxylic acids such as benzoic, 3-(pentafluorophenyl)propionic, and oleic acids; dicarboxylic acids such as maleic, tartaric, and oxydiacetic acids; tricarboxylic acids such as 1,3,4-pentanecarboxylic, nitrilotriacetic, citric, and 1,2,4-benzenetricarboxylic acids; tetracarboxylic acids such as (ethylene dinitrilo)tetraacetic acid and benzophenonetetracarboxylic acid, as well as higher polycarboxylic acids such as benzenehexacarboxylic acid and carboxyethylcellulose.

In practice, the esterification process is carried out by contacting the cellulose substrate to be esterified with an admixture of carboxylic acid and hexahaloacetone-urea adduct. The treated substrate is heated for a time sufficient to produce the desired degree of esterification.

In the preferred practice, cellulose fabric is modified by contacting it with a mixture of a carboxylic acid of low vapor pressure and the hexafluoroacetone-urea adduct, [2,2,2-trifluoro-1-hydroxy - 1 - (trifluoromethyl)ethyl] urea, and heated until the desired modification takes place.

The hexahaloacetone-urea adducts and the modifying carboxylic acids can be applied simultaneously or separately to the cellulose or cellulose blend substrate. Any of the conventional application methods known in the textile art can be used. These include, but are not limited to padding, brushing, spraying, coating, and the like. The adducts and acids can be applied in the form of liquids, slurries, suspensions, emulsions, pastes, gels, and the like where appropriate.

The amount of carboxylic acid required cannot be stated with precision, since it is dependent, among other things, upon the acid employed and the degree of modification sought. However, in some instances, significant modification has been observed when as little as five parts by weight of acid is applied for each one hundred parts by weight of substrate.

The amount of catalyst employed is usually based upon the weight of modifying acid used. In most instances, catalyst should range from about $\frac{1}{20}$ to $\frac{1}{5}$ the weight of acid employed. However, the upper limit of catalyst is primarily governed by economic considerations.

To demonstrate the utility of the novel catalysts in the modification of cellulosic fabrics with carboxylic acids under typical reaction conditions, three illustrative examples are submitted. A short glossary of the technical terms used, and descriptions of the various testing techniques which were employed, precedes the examples.

TEST METHODS, SPECIAL TERMS, AND ABBREVIATIONS

Crease recovery angle in degrees, total of readings in filling (F) and warp (W) directions; Monsanto Method, ASTM D-1295-60T.

Tensile strength in pounds in warp direction, ravel 1-inch strip method; Federal Specifications for Textile Test Methods, CCC-T-191-b, Method 5104.1.

Parts and percentages are by weight, unless otherwise noted.

OWB: On the weight of the bath used for padding, in percent.

OWF: On the weight of the fiber (or fabric), in percent. OWB times WPU/100%=OWF.

WPU: Wet pick-up, i.e., the percentage of wet add-on OWF, measured directly after the padded fabric has passed through the squeeze rollers.

Moisture regain, percent, is determined using the procedure of ASTM D-629-59T.

EXAMPLE 1

The crosslinking of cellulose by citric acid, an esterification reaction catalyzed by the adduct of hexafluoroacetone and urea.

Eight 17-inch-square samples of plain-weave cotton fabric, commonly known as 80 x 80 printcloth, were conditioned at 21±1° C. at a relative humidity of 65±2%, and weighed to the nearest milligram. Four of the samples were padded with an aqueous solution of citric acid (15% for one pair, and 10% for the other). Rollers on the laboratory padder were set so the resulting wet pick-up was approximately 100%, as shown in Table I. The remaining four samples were padded with an aqueous solution which contained the 1:1 adduct of hexafluoroacetone and urea to the extent of 3%, along with either a 15% or 10% concentration of citric acid. Quantitative details are evident from Table I. All eight padded samples were dried at approximately 70° C. Then they were cured for 5 minutes at temperatures shown in Table I. Next, the samples were rinsed thoroughly in warm water, re-dried at approximately 70° C., conditioned again at 21±1° C. at a relative humidity of 65±2%, and re-weighed. Finally, the samples were evaluated with respect to tensile strength and recovery from creasing.

From Table I, it is apparent that Samples C and D, padded with a hexahaloacetone-urea adduct in addition to citric acid, underwent considerably more esterification than did Samples A and B, padded with only citric acid. For instance, the conditioned weight gain for a C or D sample exceeded the weight gain for the corresponding A or B sample. Dry crease recovery values for the C-D (catalyzed) samples significantly exceeded those of the corresponding A-B (uncatalyzed) samples. Despite the significant gain in dry crease recovery values, the C-D samples had appreciably greater tensile strength than did the A-B samples. In comparison with untreated specimens, strength loss was of the magnitude expected as the result of crosslinking. Greater losses, such as normally results from acid-induced degradation, were avoided the use of the adduct, an excellent catalyst for the esterification. The new catalytic system makes possible the crosslinking of cellulose by citric acid under practical conditons.

TABLE I.—CROSSLINKING OF CELLULOSE BY ESTERIFICATION WITH CITRIC ACID

| Sample | OWB, percent | | WPU, percent | OWF, percent | Approx. temp. of 5-minute cure, ° C. | Wt. gain, percent | Warp tensile strength, pounds | Dry crease recovery angle, F+W, degrees |
| --- | --- | --- | --- | --- | --- | --- | --- | --- |
| | Citric acid | Adduct (catalyst) | | | | | | |
| A-1 | 15 | None | 98 | 14.7 | 150 | 2.63 | 19 | 202 |
| A-2 | 15 | None | 101 | 15.2 | 177 | 5.46 | 14 | 227 |
| B-1 | 10 | None | 101 | 10.1 | 150 | 1.87 | 24 | 194 |
| B-2 | 10 | None | 100 | 10.1 | 177 | 4.41 | 15 | 230 |
| C-1 | 15 | 3 | 101 | 15.2 | 150 | 6.10 | 29 | 225 |
| C-2 | 15 | 3 | 103 | 15.4 | 177 | 9.08 | 23 | 254 |
| D-1 | 10 | 3 | 96 | 9.6 | 150 | 3.96 | 34 | 213 |
| D-2 | 10 | 3 | 99 | 9.9 | 177 | 6.37 | 27 | 254 |
| Control | Averages: 5 untreated specimens | | | | | | 59 | 193 |

EXAMPLE 2

The esterification of cellulose by oleic acid, catalyzed by an adduct of hexafluoroacetone and urea Two 8-by-12-inch samples of 80 x 80 cotton printcloth were conditioned and weighed as in Example 1. Both samples (E and F) were padded with a 15% solution of oleic acid in p-dioxane. For each sample, the wet pick-up was 93 ± 1%, and the percentage of oleic acid on the weight of the fabric was 14.0 ± 0.2%. Both samples were dried at approximately 65° C. Sample E was cured directly for 5 minutes at approximately 177° C., whereas Sample F was overpadded with a 3% aqueous solution of the 1:1 adduct of hexafluoroacetone and urea, then re-dried at approximately 65° C., and cured for 5 minutes at approximately 177° C. After the cure, both samples were rinsed in p-dioxane, then in water, re-dried, conditioned again at 21 ± 1° C. at a relative humidity of 65 ± 2%, and re-weighed. From the conditioned weight gain, it was apparent that esterification occurred only with Sample F, which had a weight gain of 0.45%, because no weight gain was measurable on Sample E. Thus, under otherwise identical conditions, the presence of a polyhaloacetone-urea adduct catalyzed the formation of cellulose oleate, whereas no discernible esterification occurred in the absence of the adduct.

EXAMPLE 3

The crosslinking of carboxyethylcellulose, an esterification reaction catalyzed by an adduct of hexafluoroacetone and urea First, a large sample of 80 x 80 cotton printcloth was treated so as to convert part of the cellulose into carboxyethylcellulose by means of the following overall reaction in a manner similar to that discussed by R.M. Reinhardt and J. S. Bruno, Journal of Applied Polymer Science, Volume 10, pages 387–397 (March 1966).

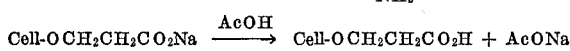

The cotton printcloth sample was conditioned and weighed as in Example 1. The fabric was padded with an aqueous solution, of which 14.0% was acrylamide, and 12.5% was sodium hydroxide. The wet pick-up was approximately 110%. As it came from the squeeze rollers, the wet fabric was rolled into a cylinder and put into a test tube. The test tube was kept for one hour at 80° C. to allow for the above-indicated reactions of addition and saponification to proceed in the wet environment. Then the sample was removed from the tube, and rinsed, first in excess dilute acetic acid, and then in water. The fabric was dried, conditioned as before, and re-weighed. In order to determine the moisture regain, test portions of the conditioned sample were cut out, oven-dried at 107 ± 30° C. for 1.25 hours, and re-weighed. Results on the test portions of carboxyethylated cotton were as follows at this stage (Table II).

TABLE II

Carboxyethylated cotton

| | Values in precent |
|---|---|
| Conditioned weight gain | 7.04±0.35 |
| Moisture regain | 9.72±0.27 |
| Weight gain, corrected for moisture regain | 3.62±0.42 |

Note: Carboxyethylated cotton is more hygroscopic than cotton. In comparison, the untreated cotton fabric had a moisture regain of 6.47%.

For the next stage, five smaller samples were cut from the carboxyethylated cotton fabric. One smaller sample was evaluated directly, two smaller samples were cured for 5 minutes at approximately 150° C. and 177° C., respectively (without being overpadded), and the remaining two smaller samples were overpadded with an aqueous 3% solution of the 1:1 adduct of hexafluoroacetone and urea, then re-dried, and cured for 5 minutes at approximately 150° C. and 177° C., respectively. Finally, the samples were rinsed in water, re-dried, conditioned again at 21 ± 1° C. at relative humidity of 65±2%, and re-weighed. The samples were evaluated with respect to tensile strength and recovery from creasing. Crease recovery served as a measure of the extent of crosslinking of the following type brought about by esterification catalyzed by the adduct.

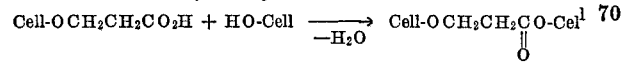

Carboxyethylcellulose    Cellulose    Crosslinked Cellulose

Within this series of samples, the highest dry crease recovery angles resulted when the hexafluoroacetone-urea adduct was used. Hence, the greatest extent of esterification resulting in crosslinking occurred in the presence of the adduct, which catalyzed the reaction.

As indicated earlier the hexahaloacetone-urea catalysts of this process are advantageous in several respects. For instance, the use of these esterification catalysts permits the direct use of organic acids of low volatility in the esterification and crosslinking of cellulose including cellulosic fibers. Further, the esterification takes place rapidly at moderate reaction temperatures and the esterified product suffers relatively little degradation to its cellulose backbone chain. An additional advantage of the catalytic adducts of this invention is that they are water-soluble compounds which can be admixed with water-soluble carboxylic acids. Further, unlike the precursor hexahaloacetones which are deficient as textile-esterification catalysts because of their low boiling points, the inventive catalysts offer the advantage of having negligible volatility and thus can be employed at elevated temperatures wherein rapid esterification takes place.

As indicated above, this invention lends itself to numerous modifications and changes without departing from the inventive concept. The metes and bounds of the invention are best indicated by the claims which follow:

What is claimed is:

1. An improved catalytic process for modifying cellulose substrates comprising:
   (a) treating a cellulose substrate with a modifying amount of a carboxylic acid in the presence of a catalytic amount of a hexahaloacetone-urea adduct of the formula:

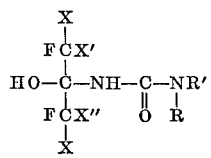

wherein X, X' and X" are halogen atoms and R and R' are selected from the group consisting of hydrogen and lower alkyl groups having less than six carbon atoms, and
   (b) heating the treated substrate until the desired degree of modification takes place.

2. The process of claim 1 wherein X, X' and X" are fluorine.

3. The process of claim 2 wherein R and R' are hydrogen.

4. The process of claim 3 wherein the carboxylic acid is oleic acid.

5. The process of claim 3 wherein the carboxylic acid is a polycarboxylic acid.

6. The process of claim 3 wherein the polycarboxylic acid is citric acid.

7. The process of claim 5 wherein the polycarboxylic acid is carboxyethylcellulose.

8. The process of claim 3 wherein
   (a) the hexafluoroacetone-urea adduct is a 1:1 adduct,
   (b) the weight ratio of catalytic adduct to carboxylic acid ranges from about 1:3 to about 1:5,
   (c) the treated cellulose substrate is in the form of a fabric, and
   (d) the treated substrate is heated at about 150° C. until modification takes place.

9. An improved composition for modifying cellulose comprising:
   (a) a carboxylic acid, and
   (b) a hexahaloacetone-urea adduct of the formula:

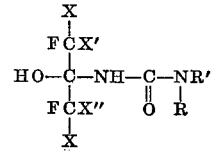

wherein X, X' and X" are halogen atoms and R and R' are selected from the group consisting of hydrogen and lower alkyl groups having less than six carbon atoms.

10. The composition of claim 9 wherein X, X' and X" of the adduct are fluorine atoms and R and R' are hydrogen.

11. The composition of claim 10 wherein the carboxylic acid is selected from the group consisting of oleic acid, citric acid and carboxyethylcellulose.

References Cited

UNITED STATES PATENTS 2,759,787  8/1956  Touey et al. _____ 260—224

OTHER REFERENCES

New Allis et al., the Journal of Organic Chemistry, vol. 29, No. 10, October 1964, pp. 3114–3116.

Reinhardt et al., Journal of Applied Polymer Science, vol. 10, No. 3, March 1966, pp. 387–397.

DONALD E. CZAJA, Primary Examiner

R. W. GRIFFIN, Assistant Examiner

U.S. Cl. X.R.

8—120; 106—171, 178, 181, 184; 252—438; 260—96.5, 224, 227

PO-1050
(5/69)

UNITED STATES PATENT OFFICE
CERTIFICATE OF CORRECTION

Patent No. 3,472,839                    Dated October 14, 1969

Inventor(s) GIULIANA C. TESORO

It is certified that error appears in the above-identified patent and that said Letters Patent are hereby corrected as shown below:

Column 2, line 14, "blend" should read -- blends -- .
Column 4, lines 42 and 43, "were avoided the use of" should read -- were avoided through the use of -- .
Column 5, line 40, " $\pm 30°C$." should read -- $\pm 3°C$. -- .

SIGNED AND
SEALED
FEB 17 1970

(SEAL)
Attest:

Edward M. Fletcher, Jr.
Attesting Officer

WILLIAM E. SCHUYLER, JR.
Commissioner of Patents